United States Patent [19]

Iwata

[11] 4,440,129
[45] Apr. 3, 1984

[54] IGNITION TIMING CONTROL SYSTEM FOR INTERNAL COMBUSTION ENGINE

[75] Inventor: Toshio Iwata, Himeji, Japan

[73] Assignee: Mitsubishi Denki Kabushiki Kaisha, Tokyo, Japan

[21] Appl. No.: 523,902

[22] Filed: Aug. 17, 1983

[30] FOREIGN APPLICATION PRIORITY DATA

May 5, 1979 [JP] Japan .............. 54-59511

Related U.S. Application Data

[63] Continuation of Ser. No. 370,996, Apr. 22, 1982, abandoned, which is a continuation of Ser. No. 147,542, May 7, 1980, abandoned.

[51] Int. Cl.³ .............................................. F02P 5/14
[52] U.S. Cl. ..................................... 123/425; 73/35
[58] Field of Search ............... 123/425, 435, 415, 419; 73/35

[56] References Cited

U.S. PATENT DOCUMENTS

| | | | |
|---|---|---|---|
| 3,942,359 | 3/1976 | Arrigoni et al. | 73/35 |
| 4,002,155 | 1/1977 | Harned et al. | 73/35 |
| 4,111,035 | 9/1978 | West et al. | 73/35 |
| 4,116,173 | 9/1978 | McDougal et al. | 123/425 |
| 4,211,194 | 7/1980 | Hattori et al. | 123/425 |
| 4,236,491 | 12/1980 | Hattori et al. | 123/425 |
| 4,282,841 | 8/1981 | Takagi et al. | 123/425 |

*Primary Examiner*—Andrew M. Dolinar
*Attorney, Agent, or Firm*—Wenderoth, Lind & Ponack

[57] ABSTRACT

An acceleration sensor senses mechanical noise components and knock signals originating from an internal combustion engine. An output from a filter used for attenuating the noise components is applied to both an analog gate which is closed for some time period after each ignition time by a gate timing controller and to a noise level detector. An outpt from the analog gate is compared with a DC voltage due to the attenuated noise components delivered by the detector to form pulses. After having been integrated, the pulses shift a phase of an ignition signal to cause the ignition timing to be retarded.

2 Claims, 5 Drawing Figures

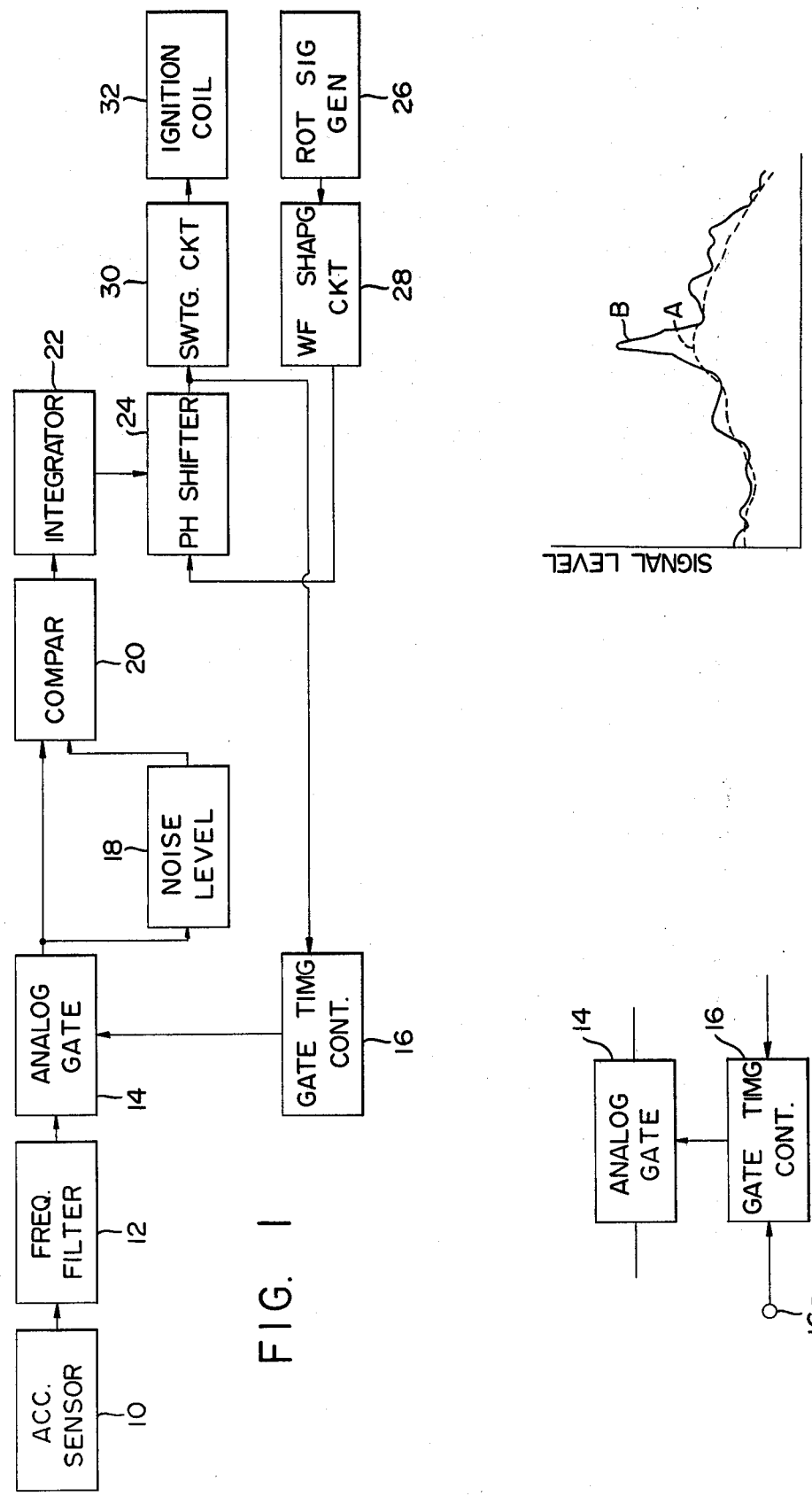

IGNITION TIMING CONTROL SYSTEM FOR INTERNAL COMBUSTION ENGINE

This application is a continuation of now abandoned application Ser. No. 370,996, filed Apr. 22, 1982, which is in turn a continuation of now abandoned application Ser. No. 147,542, filed May 7, 1980.

BACKGROUND OF THE INVENTION

This invention relates to an ignition timing control system for an internal combustion engine.

The ignition timing of internal combustion engines is set so as to maximize the efficiency of the engine with respect to the mode of operation thereof. It is generally desirable to set the ignition timing so that the particular internal combustion engine approaches a minimum advance for the best torque which may be abbreviated to "MBT" as close as possible within the range in which knocking is not caused in the engine. However, ignition timing control systems previously equipped on internal combustion engines have been, in many cases, of the mechanical type and the ignition advance angle characteristic thereof have not been stable with respect to deviations of dimensions and secular changes of components involved. Therefore, the ignition timing has been actually set to retard the timing somewhat behind the optimum ignition timing point which provides the most desirable advance angle characteristic in order to prevent the occurrence of knocking. In such a case, the engine efficiency is deteriorated. Furthermore, even if ignition timing control systems which are free from both deviations of their dimensions and secular changes, as described above, would be employed, knocking occurring in an associated internal combustion engine depends upon the inlet air temperature and the inlet humidity of the engine and further upon the air fuel ratio thereof etc. Accordingly, if the ignition timing could be set so as not to cause knocking in the engine in some mode of operation, there might be a fear that knocking would be caused in the engine in another mode of operation.

Therefore, by sensing knocking and controlling the ignition timing to retard same upon the occurrence of knocking, the ignition timing can be adjusted so that knocking is scarcely caused even though an error would occur in the ignition advance angle characteristics due to the deviations as described above of the mechanical apparatus and differences between the modes of operation. Knocking can be sensed according to any method of measuring a pressure within the combustion chamber of internal combustion engines, the acceleration of vibrations of the engines, sound generated in the engines, etc. In actual motor vehicles, the method of measuring the acceleration of vibration of an associated engine is most practical in view of a position where an acceleration sensor involved is mounted, the processing of signals, etc. As the method of measuring the acceleration is responsive to a knock singal and simultaneously to vibrational noise signals, it has been necessary to select the knock signal from among the vibrational noise signals.

Accordingly, it is an object of the present invention to provide a new and improved ignition timing control system for an internal combustion engine for determining the optimum ignition timing by sensing a knock signal from an output from an acceleration sensor for sensing the acceleration of a vibration of an associated internal combustion engine without various noise components interfering with the knock signal, and controlling the ignition timing in accordance with the sensed knock signal.

SUMMARY OF THE INVENTION

The present invention provides an ignition timing control system for an internal combustion engine comprising an acceleration sensor for sensing the acceleration of a vibration of an internal combustion engine, a discrimination means for removing noise signal components from an output from the acceleration sensor and selecting a knock signal component, the discrimination means including at least an analog gate for interrupting and controlling the passage of the output from the acceleration sensor therethrough, and a gate timing controller for determining the switching timing of the analog gate, a reference ignition timing generator means for generating a reference ignition timing signal, a phase shifting means responsive to an output from the discrimination means to shift a phase of the reference ignition timing signal, an ignition coil, and a switching means for interupting a flow of current to the ignition coil in synchronism with an output from the phase shifting means.

BRIEF DESCRIPTION OF THE DRAWINGS

The present invention will become more readily apparent from the following detailed description taken in conjunction with the accompanying drawings in which:

FIG. 1 is a block diagram of one embodiment according to the engine ignition timing control system of the present invention;

FIG. 2 is a graph illustrating the frequency characteristic of the acceleration sensor shown in FIG. 1;

FIG. 5 is a block diagram of the essential portion of a modification of the present invention.

DESCRIPTION OF THE PREFERRED EMBODIMENTS

Figure 3:
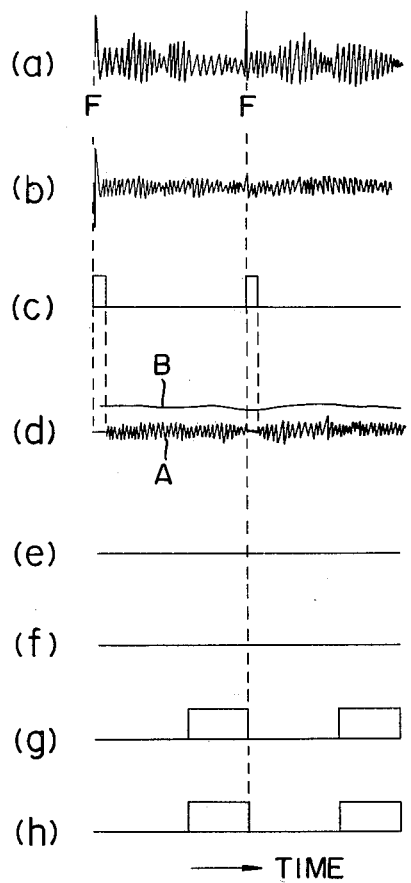
FIG. 3 is a graph illustrating waveforms developed at various points in the arrangement shown in FIG. 1 and put in the mode of operation in which no knocking is caused in an associated internal combustion engine.

Referring now to FIG. 1 of the drawings, there is illustrated one embodiment according to the engine ignition timing control system of the present invention. The arrangement illustrated comprises an acceleration sensor 10 mounted on an internal combustion engine involved (not shown) to sense an acceleration of a vibration of the engine, a frequency filter 12, connected to the acceleration sensor 10, to permit those frequency components of an output signal from the acceleration sensor 10 having a high sensitivity to knocking to pass therethrough, and an analog gate 14, connected to the frequency filter 12, to interrupt various noise components of the output signal from the frequency filter 12 interfering with the detection of knocking, and a gate timing controller 16, connected to the analog gate 14, to generate timing signals for directing the switching of the analog gate 14 during the generation of the various interferring noise components.

The analog gate 14 includes an output connected to both a noise level detector 18 and to a comparator 20 to which the output of the noise level detector 18 is also connected. The noise level detector 18 is operative to detect the level of noise signals due to mechanical vibrations of the engine and the comparator 20 is operative to compare an output voltage from the analog gate 14 with that from the noise level detector 18 to generate knock detected pulses.

Then, an integrator 22 is operative to integrate knock detected pulses from the comparator 20 to produce an integrated voltage dependent upon an intensity of the detected knocking. A phase shifter 24 is connected to the integrator 22 and is operative to shift a phase of an ignition signal for providing a reference in response to the integrated voltage therefrom. The phase shifter 24 output is also connected to the gate timing controller 16.

As shown in FIG. 1, a signal generator 26 is connected to a waveform shaping circuit 28 which is subsequently connected to the phase shifter 24. The signal generator 26 generates an ignition signal in accordance with a predetermined ignition advance angle characteristic. The waveform shaping circuit 28 shapes the waveform of the ignition signal from the signal generator 26 and simultaneously ultimately controls the dwell angle of the current which flows through an ignition coil 32. A switching circuit 30 is connected between the phase shifter 24 and the ignition coil 32 to cause the power supply to the ignition coil 32 to be interrupted in response to an output signal from the phase shifter 24.

The output signal from the acceleration sensor 12 has the frequency characteristic as shown be dotted curve A in FIG. 2 in the absence of knocking and as shown by solid curve B in FIG. 2 in the presence of knocking. In the presence of knocking, the output signal from the acceleration sensor 12 includes a knock signal, mechanical noise components resulting from the engine, various electrical noise components resulting from the engine, various electrical noise components passing through signal transfer paths, for example, ignition noise, etc. From the comparison of solid curve B with dotted curve A, it is seen that the konck signal has the peculiar frequency characteristic. Therefore, after the output signal from the acceleration sensor 10 has passed through the frequency filter 12, the knock signal remains substantially unchanged in amplitude while the noise components having the frequency characteristic other than that of the knock signal can be suppressed. This results in a great increase in sensitivity of the knock signal relative to the noise components.

Figure 4:
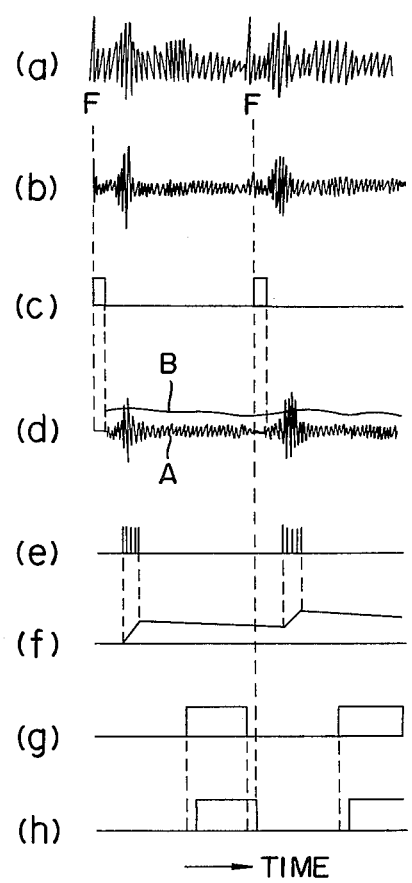
FIG. 4 is a graph similar to FIG. 3 but illustrating the mode of operation in which knocking is caused in the engine.

The operation of the arrangement shown in FIG. 1 will now be described with reference to FIGS. 3 and 4. FIG. 3 shows waveforms developed at various points in the arrangement of FIG. 1 when knocking is not quite caused in an internal combustion engine involved. FIG. 4 shows waveforms developed at the same points as those specified in FIG. 3 when knocking is caused in the engine.

The engine is rotated to cause the rotary signal generator 26 to generate a ignition signal in accordance with the predetermined ignition timing characteristic. The waveform shaping circuit 28 shapes the waveform of the ignition signal into a switching pulse having a desired dwell angle. This switching pulse drives the switching circuit 30 through the phase shifter 24 to cause a flow of current to the ignition coil 30. Upon interrupting this flow of current, an ignition voltage induced across the ignition coil 30 ignites and operates the engine. During the operation thereof, the engine causes vibrations which are, in turn, detected by the acceleration sensor 10.

Without knocking caused in the engine, vibrations thereof are not caused from knocking, but the output signal from the acceleration sensor 10 includes mechanical noise and ignition noise passing through the signal transfer paths at each of ignition time point F as shown at waveform a in FIG. 3. By passing that output signal through the frequency filter 12, signal components due to the mechanical noise are considerably suppressed as shown at waveform b in FIG. 3. However, signal components due to the ignition noise are strong and therefore may be developed at high levels even after the passage thereof through the frequency filter 12. If the latter signal components are left as they are then the ignition noise will have been mistaken for a knock signal.

In order to avoid such a mistake, an output (see waveform c, FIG. 3) from the gate timing controller 16, triggered with the output signal from the phase shifter 24, causes the analog gate 14 to be closed and maintained in its closed state for some time period which is started with the ignition time point. This results in the interruption of the ignition noise. Therefore, only mechanical noise components at low levels are left at the output of the analog gate 14 as shown at waveform d, A in FIG. 3. On the other hand, the noise level detector 18 is responsive to a change in peak value of the output signal from the analog gate 14 to generate a DC voltage having a value somewhat higher than the peak value of the mechanical noise components. It is here to be noted that the noise level detector 18 has a sensitivity with which the detector is operative in response to a relatively slow change in peak value of the usual mechanical noise components. This DC voltage is shown at waveform d, B in FIG. 3. As shown at waveforms d, A and d, B, the output from the noise level detector 18 is higher than the mean peak value of the output from the analog gate 14 and therefore, the comparator 20 compares the two with each other to provide a null output as shown in FIG. 3, e. As a result, the noise signals are entirely removed.

From the foregoing it is seen that the frequency filter 12 forms a discrimination means with the analog gate 14 and the gate timing controller 16.

Under these circumstances, an output voltage from the integrator 22 remains null as shown in FIG. 3, f and the phase angle which is shifted by the phase shifter 24 becomes null. Accordingly, the current flowing through the ignition coil 30 is turned on and off in phase with the reference ignition signal from the waveform shaping circuit 28 (see waveform g, FIG. 3) as illustrated at waveform h in FIG. 3. As a result, the ignition time point remains unchanged.

Upon the occurrence of knocking, the output signal from the acceleration sensor 10 includes, in addition to the noise components as described above in conjunction with the waveform a shown in FIG. 3, a knock signal developed with some time delay relative to each ignition time point F as shown at waveform a in FIG. 4. After having passing through the frequency filter 12, the knock signal is scarcely attenuated and the noise signals are considerably attenuated as shown at waveform b in FIG. 4. This waveform b passes through the analog gate 14 after the closure thereof as described above to change to waveform A shown in FIG. 4d including high knock signals superposed on the attenuated machanical noise components. As those knock signals leaving the analog gate 14 have a sharp risetime, a DC voltage level (see waveform B, FIG. 4d), delivered from the noise level detector 18, lags in response with respect to the knock signals.

As a result, the output of the comparator 20 has pulses developed thereat as shown at waveform e in FIG. 4. Then, the integrator 22 integrates those pulses into an integrated voltage as shown at waveform f in FIG. 4.

The phase shifter 24 responds to the integrated voltage to shift the phase of the signal from the waveform shaper circuit 28 (see waveform g, FIG. 4) to the retard side. This results in the output from the phase shifter 24 having its phase lagging behind that of the reference ignition signal from the waveform shaping circuit 28. This output drives the switching circuit 30 as shown at waveform h in FIG. 4. Accordingly, the ignition time point is retarded whereby knocking ceases to occur, resulting in a knock free state.

From the foregoing it is seen that the resulting control system effects the closed loop control conducted with the engine, the detection of knocking of the engine, the ignition timing and the engine in the named order. In the control system, a control point is set to a balanced retard angle point of a charge and a discharge voltage from the integrator 22, as determined by the output pulses from the comparator 20, resulting from the occurrence of knocking. Since this control point gives a limit as to the occurrence of knocking, the control point results in a maximum power point within a range in which knocking is scarcely caused and ignition time points have been set with a good efficiency of its associated internal combustion engine.

In the arrangement of FIG. 1, the reference ignition signal is applied to the gate timing controller 16 to thereby close the analog gate for some time period starting with each ignition time point, but the gate timing controller 16, connected to the analog gate 14, may be provided with an external input terminal 16a as shown in FIG. 5. The arrangement illustrated can close the analog gate 14 for a specified time period by having an external signal applied to the external input terminal 16a.

From the foregoing it is seen that the present invention comprises an acceleration sensor for sensing vibrations of an internal combustion engine involved and discrimination means for removing noise components from an output from the acceleration sensor due to the vibration of the engine and selecting knock signals, and makes it possible to control ignition time points with a good engine efficiency so as to cause knocking to scarcely occur by delaying the ignition time points with an output from the discrimination means to suppress the occurrence of knocking. Furthermore, the discrimination means includes at least the analog gate to block various interferring noises upon sensing knocking with the result that knocking can be reliably sensed and that the optimum control of the ignition time points is rendered possible.

While the present invention has been illustrated and described in conjunction with a few preferred embodiments thereof, it is to be understood that numerous changes and modifications may be resorted to without departing from the spirit and scope of the present invention. For example, during the start of the engine where the output from the acceleration sensor is not stable, the analog gate may be closed with an output from a start switch or a rotation detector circuit. In the latter case, the engine may be ignited at each of the reference ignition time points. Also, upon the occurrence of mechanical noise in synchronization with a rotation angles of the engine, the analog gate may be closed in a specified range of rotational angles by a rotational angle detector resulting in the prevention of the noise.

What is claimed is:

1. An ignition timing control system for an internal combustion engine comprising an acceleration sensor for sensing an acceleration of a vibration of an internal combustion engine, a discrimination means for removing noise signal components from an output from said acceleration sensor and for selecting a knock signal component, said discrimination means including at least an analog gate for interrupting and controlling the passage of said output from said acceleration sensor therethrough and a gate timing controller for closing said analog gate for predetermined time intervals, each of said intervals commencing with each time point at which said engine is ignited and arranged so as to eliminate ignition noise components from said sensor output, a reference ignition timing generator means for generating a reference ignition timing signal, a phase shifting means responsive to an output from said discrimination means to shift a phase of said reference ignition timing signal, an ignition coil, and switching means for interrupting the flow of current to said ignition coil in synchronism with an output from said phase shifting means; wherein said discrimination means further comprises a noise level circuit means and a comparator means and an integrator means operatively serially connected between said analog gate and said phase shifter, wherein said noise level circuit means generates a DC voltage having a value which is higher than a peak value of mechanical noise components of said output of said acceleration sensor, and wherein said comparator means compares said output from said analog gate with an output from said noise level circuit means so as to eliminate said mechanical noise components from said output of said acceleration sensor means, and wherein said integrator means integrates an output from said comparator so as to provide an integrated voltage which is dependent upon an intensity of detected knocking of said internal combustion engine.

2. An ignition timing control system as recited in claim 1, further comprising a frequency filter means operatively connected between said acceleration sensor and said analog gate and having a center frequency corresponding to a characteristic frequency of said knock signal component of said acceleration sensor output.

* * * * *